May 30, 1961      R. P. FLAGG      2,986,369
STEP OPENING SOLENOID VALVE
Filed Sept. 8, 1958
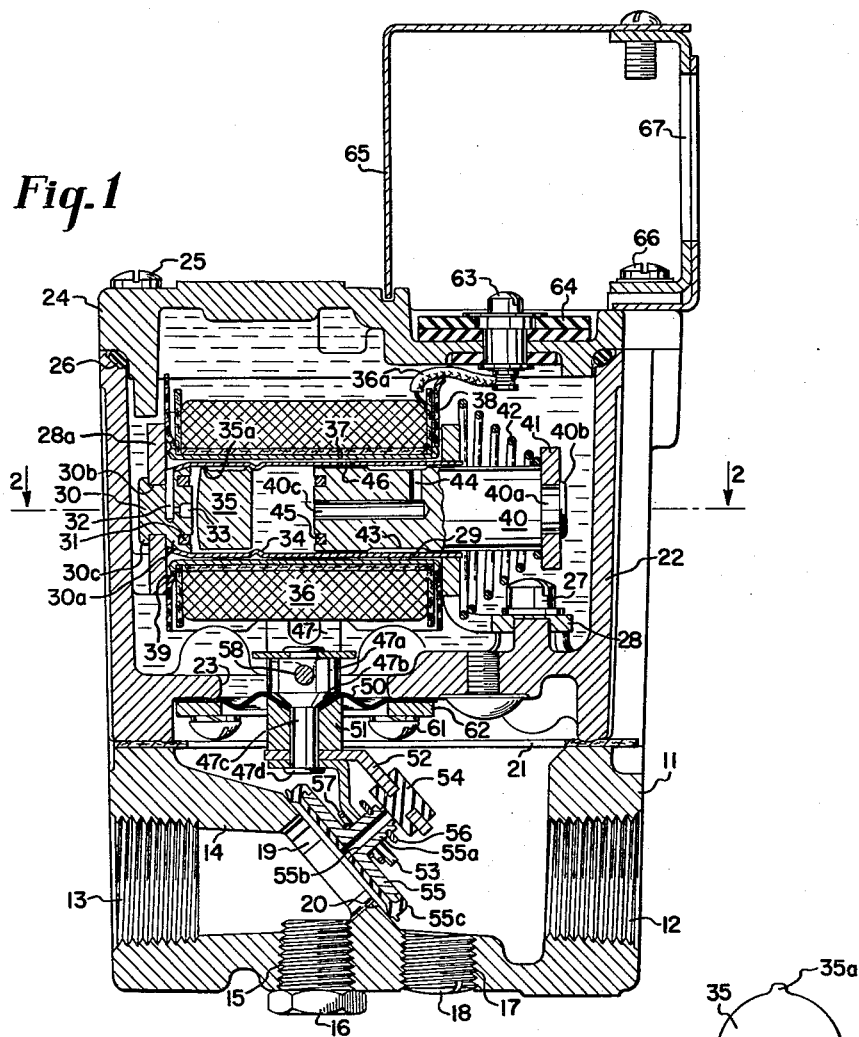
Fig.1
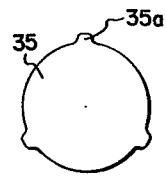
Fig.2
Fig.3
INVENTOR.
RAYMOND P. FLAGG
BY
*Alan M. Staubly*
ATTORNEY United States Patent Office 2,986,369
Patented May 30, 1961

2,986,369
STEP OPENING SOLENOID VALVE
Raymond P. Flagg, Golden Valley, Minn., assignor to Minneapolis-Honeywell Regulator Company, Minneapolis, Minn., a corporation of Delaware
Filed Sept. 8, 1958, Ser. No. 759,790
8 Claims. (Cl. 251—54)

This invention relates to solenoid valves and, more particularly, to step opening solenoid valves for the control of fuel to a furnace.

In heating installations, it is highly desirable that only sufficient fuel be supplied to a furnace for ignition purposes during the early stages of operation thereof so as to enable the stack or chimney to become warm to create proper convection currents to exhaust the products of combustion and to insure the proper draft to draw in sufficient air for complete combustion of the fuel.

It is one of the objects of this invention to provide a solenoid valve which will function in a manner to assure proper combustion of the fuel supplied to a furnace through the valve.

It is another object of the invention to provide a quiet operating solenoid valve that will initially open to an amount just sufficient to assure proper ignition of the fuel and then move on slowly to its open position so as to prevent the delivery of an excessive amount of fuel to the furnace while the stack is warming up.

Still further objects of the invention will become apparent upon reading the following detailed description of the invention in conjunction with the accompanying drawing wherein:

Figure 1 is a vertical sectional view through the solenoid valve;

Figure 2 is a fragmentary sectional view taken along line 2—2 of Figure 1; and

Figure 3 is an end view of a check valve in the closed end of the plunger tube of the solenoid.

As can be seen from the drawing, the valve body, generally designated by the reference numeral 11, has a threaded inlet 12, a threaded outlet 13, and an inclined partition wall 14 therebetween. An optional outlet 15 is closed by a plug 16 while an optional outlet 17 on the inlet side of the partition wall, which is adapted to be connected to a pilot burner, is closed by means of a plug 18. An aperture 19 through the partition 14 has a milled valve seat 20 on the inlet side thereof for engagement by a disc valve to be presently described.

Secured to the open top of the valve body 11, by means of bolts not shown, with a sealing gasket 21 therebetween, is a generally cup-shaped housing 22 having an aperture 23 therein in its bottom wall and an open top. The top is closed by a cover 24 secured thereto by means of bolts 25, with an O-ring seal 26 therebetween.

Secured to the bottom wall of the housing 22, by means of bolts 27, is a bracket 28 that supports a solenoid tube 29.

The solenoid tube has an open end where it extends through a hole in the bracket 28, and has its other end secured to the base of a U-shaped bracket portion 28a, that is secured at its ends to the bracket 28, to serve as a core member for the solenoid. A stop member 30 has a beveled head portion 30a that seals said other end of the plunger tube, a reduced diameter portion 30b that extends through a hole in the bracket portion 28a and is headed over at 30c, to secure the solenoid plunger tube to the bracket portion 28a. The stop has a shading ring 31 in its inner end, a radial bore 32 intermediate its ends and a stepped axial bore 33 leading from the inner end thereof to the radial bore, to provide a fluid flow passage from the inner end of the solenoid tube to the exterior of the solenoid tube at the closed end thereof. An inwardly struck annular rib 34 is formed on the plunger tube a spaced distance from the closed end thereof to provide an abutment shoulder therein to retain a valve 35 between the rib and the stop 30.

The valve 35 is made of magnetic material and has a plurlity of knobs 35a thereon to hold it spaced from the side wall of the tube so as to allow for fluid flow along it to opposite ends thereof. It is held in fairly close spaced relationship with the stop 30 by means of the annular rib 34.

A solenoid coil 36, formed on a bobbin 37 surrounds the solenoid tube and is insulated from the bracket core 28 and 28a by means of an insulation strip 38. One end of the strip is corrugated at 39 to resiliently hold the coil 36 firmly against the bracket 28. The solenoid plunger 40 has a U-shaped yoke 41 secured thereto by having a reduced diameter portion 40a of the plunger extend through an aperture in the yoke 41 and headed over at 40b. A coiled compression spring 42 normally biases the solenoid plunger outwardly of the solenoid tube to the position shown in Figure 1 of the drawing.

The entire chamber formed by the casting 22 and the cover 24 is filled with oil or other suitable liquid.

An annular groove 43, formed intermediate the ends of the plunger, communicates with a radial bore 44 extending into the center of the plunger near the center of its length, with the inner end of the bore 44 communicating with an axial bore 40c extending inwardly from the inner end of the plunger. A shading ring 45 is imbedded in the inner end of the solenoid plunger.

Extending through the side wall of the plunger tube, intermediate the ends thereof and substantially half way between the inner end of the plunger tube and the adjacent end of the annular groove 43, is a port 46 that permits fluid flow between the interior of the plunger tube and the exterior thereof, there being slight spacing of the bobbin 37 of the solenoid coil from the side wall of the plunger tube.

The ends of the yoke 41, on the solenoid plunger, are pivotally connected to a Y-shaped lever 47 by means of pivots 48 extending through slots 49 extending lengthwise of the arms of the Y-shaped lever 47. The base of the lever has a stem portion 47a with a reduced diameter portion extending upwardly through a hole in the cross piece of the Y and headed over to hold the two parts together. The lower end of the stem portion has an inwardly beveled portion 47b and a reduced diameter portion 47c that extends through a diaphragm 50. A sleeve 51, having an upwardly and outwardly beveled upper end, is clamped against the under side of the diaphragm 50 to sealingly hold it against the beveled portion 47b of the base of the lever 47.

Positioned between the sleeve 51 and a headed over portion 47d, are two valve supporting arms 52 and 53. The arm 53 supports a disc valve 55 which is adapted to seat on the valve seat 20. The arm 52 carries a rubber button valve 54, coaxially arranged with respect to the valve 55. The valve 55 has a washer-shaped rubber face 55c and a long hollow stem 55a that extends through a slightly larger opening in the end of the arm 53 and has an annular groove near its outer end that receives a split washer 56 to serve as an abutment shoulder for engagement with the arm 53. The passage through the stem is designated by the reference numeral 55b. A coiled compression spring 57 resiliently holds the valve disc 55 against its seat when the solenoid coil is de-energized and the elements of the actuating mechanism are in the position shown in Figure 1 of the drawing. In this position, the washer 56 is spaced from the arm 53 and the button valve 54 is in engagement with the upper end of the hollow stem 55a. It is deemed to be obvious that initial movement of the arms 52 and 53 will first cause button valve 54 to move away from the stem 55a while the spring 57 retains the disc valve 55 against the valve seat 20 until the arm 53 reaches the split washer 56 to positively lift the valve disc 55 off of its valve seat.

The lever 47 is rockable on a pivot 58 which extends through the base portion 47a of the Y-shaped lever 47 and rests in slots 59 formed in the top surface of the base of the housing 22. The pivots are retained in the slots by staking over a portion 60a of a small rib 60 formed on the inner surface of the housing adjacent the grooves 59. The peripheral edge of the diaphragm seal 50 is clamped to the under surface of the housing 22 by means of bolts 61 extending through a clamping ring 62.

The lead wires from the solenoid coil are connected to terminals 63 which, in turn, extend through apertures in the cover plate 24 and through the terminal plate 64. A cover 65 for the terminal plate is secured to the cover 24 by means of bolts 66. The cover has an opening 67 therein adapted to receive a conduit connector (not shown) through which lead wires may pass for connection to the terminal 63.

Operation

With the valve installed in a heating system in a conventional manner, the furnace will be in its non-operating condition with the elements of the valve in the position shown in the drawing. In this position the solenoid is de-energized and the valves 54 and 55 are closed.

Upon a call for heat, as by a room thermostat closing a circuit to the solenoid, the valve 35, which is made of magnetic material, will be magnetically attracted against the closed end or stop 30 simultaneously with the plunger 40 being drawn into the solenoid tube. The amount of movement of the valve 35 is sufficiently great as to permit a limited flow of the oil through the bores 33 and 32 to the exterior of the solenoid tube before the bore 33 is sealed off by the valve 35 and thus permits a limited amount of quick movement of the plunger into the solenoid tube and rocking of the lever 47 to lift the valve 54 slightly off of the end of the hollow stem 55a. This establishes a minimum flow of fuel through the valve so as to assure proper ignition of the gas by any suitable igniting means. Once the bore 33 has been sealed by the valve 35, the movement of the plunger into the tube will be extremely slow due to the fact that the plunger substantially fills the plunger tube and oil within the tube cannot escape around the plunger to the exterior of the tube at a fast rate. This will tend to cause a very slight, gradual increase in the amount of fuel flowing to the burner through the valve for at least four seconds or the time generally required for the stack to become sufficiently heated, to create proper draft conditions, to insure proper combustion of the fuel. When the plunger reaches a position in the tube which permits the inner end of the annular groove 43 to register with the opening 46 in the tube, oil in the tube, between the valve 35 and the inner end of the plunger, can escape much more rapidly through the bore 40c, radial bore 44, annular groove 43 and the opening 46 to the exterior of the plunger tube. This enables fairly rapid opening of the valve 55 to its full open position. It might be observed that most of the gradual increase in fuel flow from the time of initial cracking of the valve 54 off of the end of the hollow stem 55a is due to the additional movement of the valve 54 away from the stem 55a rather than the cracking of the valve 55 off of its seat 20.

Upon the room thermostat becoming satisfied, the energization of the solenoid coil 36 will cause the spring 42 to bias the plunger outwardly of the solenoid tube and in so doing will draw the valve 35 away from the opening 33 and thus permit rapid flow of oil into the closed end of the solenoid tube. It is thus seen that upon de-energization of the solenoid, there is rapid movement of the valves 55 and 54 to their closed positions.

While the preferred embodiment of the invention has been described above, it is to be understood that fairly satisfactory results can be obtained by the use of a single valve connected to the lever and cooperating with a single valve seat in the valve body. In other words, a satisfactory valve may be provided for certain applications wherein the valve 54 is eliminated, the hole through the valve stem 55 is eliminated and the lost motion connection between the lever 53 of the valve stem 55a is eliminated. With this arrangement, the initial gas flow is accomplished by initially cracking the main and only valve 55 off of its seat for lighting purposes, the slow opening of this valve while the stack or chimney is warming up and then full opening of the valve at a faster rate.

As it is deemed to be obvious that other modifications may be made in the invention without departing from the spirit thereof, it is to be understood that the scope of the invention is to be determined from the appended claims.

I claim as my invention:

1. A step-opening and fast closing valve comprising a valve body having an inlet and an outlet and a valve seat therebetween, a first valve cooperable with said seat and having a passage therethrough, a second valve arranged to close and unclose said passage, power means including a movable member for actuating said valves, said movable member having a direct connection with said second valve and a lost-motion connection with said first valve to provide for opening of said second valve prior to opening said first valve, and dashpot means for said movable member including a first flow passage and a third valve therefor also operable by said power means to its closed position after the second valve has opened so as to cause slow opening of the first valve to an intermediate position, said dashpot means also having a second flow passage cooperable with said movable member to increase the rate of flow from said dashpot when the intermediate position is reached to cause opening of the first valve at a faster dampened rate to its full open position.

2. A step-opening and fast closing valve comprising a valve body having an inlet and an outlet and a valve seat therebetween, a first valve cooperable with said seat and having a passage therethrough, a second valve arranged to close and unclose said passage, electric power means including a movable member for actuating said valves, said movable member having a direct connection with said second valve and a lost-motion connection with said first valve to provide for opening of said second valve prior to opening said first valve, and dashpot means for said movable member including an electrically operated valve associated with said power means and a first flow passage controlled by said electrically operated valve and arranged to be closed upon opening of the second valve so as to cause slow opening of the first valve to an intermediate position, said dashpot means also having a second flow passage cooperable with said movable member to increase the rate of flow from said dashpot when the intermediate position is reached to cause opening of the first valve at a faster dampened rate to its full open position.

3. A step-opening and fast closing valve comprising a valve body having an inlet and an outlet and a valve seat therebetween, a first valve cooperable with said seat and having a passage therethrough, a second valve arranged to close and unclose said passage, a solenoid for actuating said valves, said solenoid having a coil and a plunger having a direct connection with said second valve and a lost-motion connection with said first valve to provide for opening of said second valve prior to opening said first valve, and dashpot means including a first flow passage in a wall thereof and a valve operable by said solenoid coil to closed position after said plunger initially opens the second valve to cause slow opening of the first valve to an intermediate position, said dashpot means also having a second flow passage cooperable with said movable member to increase the rate of flow from said dashpot when the intermediate position is reached to cause opening of the first valve at a faster dampened rate to its full open position.

4. A fuel valve comprising a valve body having an inlet and an outlet and a valve seat therebetween, a valve movable into and out of engagement with said seat and having means normally biasing said valve to one of those positions, a solenoid for actuating said valve, said solenoid having a plunger operably connected to said valve and having a shading ring and an axial bore in its inner end with the axial bore communicating with a radial bore intermediate the plunger ends and with the radial bore terminating in an annular groove in the outer surface of the plunger, said solenoid having a tube with an open end into which the plunger extends with only slight clearance and a closed end with a passage therethrough and a shading ring therein, said tube also having an opening in the side thereof which registers with said annular groove when said valve is between its partly open and full open positions, said tube also having an electrically operable check valve positioned adjacent said closed end to seal and unseal the passage therein as the plunger starts to move into and out of the tube respectively.

5. A fuel valve comprising a valve body having an inlet and an outlet and a valve seat therebetween, a valve movable into and out of engagement with said seat and having means normally biasing said valve to one of those positions, a solenoid for actuating said valve, said solenoid having a plunger operably connected to said valve and having a shading ring and an axial bore in its inner end with the axial bore communicating with a radial bore intermediate the plunger ends and with the radial bore terminating in an annular groove in the outer surface of the plunger, said solenoid having a tube with an open end into which the plunger extends with only slight clearance and a closed end with a passage therethrough and a shading ring therein, said tube also having an opening in the side thereof which registers with said annular groove when said valve is between its partly open and full open positions, said tube also having an electrically operable valve positioned adjacent said closed end to seal and unseal the passage therein as the plunger starts to move into and out of the tube respectively, and said plunger having a shading ring therein.

6. A fuel valve comprising a valve body having an inlet and an outlet and a valve seat therebetween, a valve movable into and out of engagement with said seat and having means normally biasing said valve to one of those positions, a solenoid for actuating said valve, said solenoid having a plunger operably connected to said valve and having a shading ring and a longitudinal bore in its inner end and a transverse bore intermediate the plunger ends extending from said longitudinal bore to an annular groove in the outer surface of the plunger, said solenoid having a tube with an open end into which the plunger extends with only slight clearance and a closed end with a passage therethrough, said tube also having an opening in the side thereof which registers with said annular groove when said valve is between its partly open and full open positions, said tube also having a valve positioned adjacent said closed end to seal and unseal the passage therein as the plunger starts to move into and out of the tube respectively.

7. A step-opening and fast closing valve comprising a valve body having an inlet and an outlet and a valve seat therebetween, a first valve cooperable with said seat and having a passage therethrough, a second valve arranged to close and unclose said passage, a solenoid having a tube with openings at each end thereof and a coil around it and a plunger therein directly connected with said second valve, a lost-motion connection between said plunger and said first valve to provide for opening of said second valve prior to opening said first valve, and dashpot means including a check valve operable by said solenoid coil in said tube and associated with one of said openings to close it when said check valve and said plunger are initially moved by energization of said coil to cause opening of the second valve, said dashpot means also having an aperture cooperable with said plunger to increase the rate of flow from said dashpot means when the intermediate position is reached to cause initially slow and then fast opening of the first valve.

8. The combination of claim 7 wherein said plunger has an annular groove therein intermediate the plunger's ends, said plunger also having an axial bore in its inner end and a passage connecting said bore with said groove so that said plunger moves faster into said tube when said groove registers with said aperture.

References Cited in the file of this patent

UNITED STATES PATENTS

| | | |
|---|---|---|
| 1,166,699 | Lutz | Jan. 4, 1916 |
| 2,357,959 | Kouyoumjian | Sept. 12, 1944 |
| 2,461,608 | Laing | Feb. 15, 1949 |
| 2,702,052 | Grayson | Feb. 15, 1955 |
| 2,794,600 | Ehlke | June 4, 1957 |